(12) United States Patent
Izumi

(10) Patent No.: US 11,353,312 B2
(45) Date of Patent: Jun. 7, 2022

(54) ROUGHNESS TESTER

(71) Applicant: MITUTOYO CORPORATION, Kanagawa (JP)

(72) Inventor: Naoki Izumi, Kure (JP)

(73) Assignee: MITUTOYO CORPORATION, Kanagawa (JP)

( * ) Notice: Subject to any disclaimer, the term of this patent is extended or adjusted under 35 U.S.C. 154(b) by 108 days.

(21) Appl. No.: 17/009,304

(22) Filed: Sep. 1, 2020

(65) Prior Publication Data

US 2021/0072015 A1 Mar. 11, 2021

(30) Foreign Application Priority Data

Sep. 6, 2019 (JP) .............................. JP2019-163447

(51) Int. Cl.
  *G01B 5/28* (2006.01)
  *G01B 5/06* (2006.01)

(52) U.S. Cl.
  CPC .............. *G01B 5/28* (2013.01); *G01B 5/061* (2013.01)

(58) Field of Classification Search
  CPC .................................. G01B 5/28; G01B 5/061
  USPC ........................................... 33/551, 553, 554
  See application file for complete search history.

(56) References Cited

U.S. PATENT DOCUMENTS

| | | | | |
|---|---|---|---|---|
| 6,678,964 B2* | 1/2004 | Regitz | ..................... | G01D 5/305 33/553 |
| 6,874,243 B2* | 4/2005 | Hama | ....................... | G01B 5/28 33/551 |
| 9,285,201 B2* | 3/2016 | Matsumiya | ............... | G01B 7/28 |
| 9,291,442 B2* | 3/2016 | Hidaka | ................... | G01B 21/30 |
| 9,933,277 B2* | 4/2018 | Terauchi | ................. | G01B 5/28 |
| 10,962,343 B2* | 3/2021 | Rudkowski | ............. | G01B 5/008 |
| 11,022,418 B2* | 6/2021 | Kanematsu | .......... | G01B 5/0009 |
| 11,085,752 B2* | 8/2021 | Nakayama | ............... | G01B 5/20 |
| 11,156,537 B2* | 10/2021 | Kawazoe | ................. | G01N 3/08 |
| 2020/0124393 A1* | 4/2020 | Rudkowski | ............ | G01B 5/008 |

FOREIGN PATENT DOCUMENTS

| | | |
|---|---|---|
| JP | 3373465 | 11/2002 |
| JP | 3443054 | 6/2003 |
| JP | 3531924 | 3/2004 |
| JP | 3640201 | 1/2005 |

\* cited by examiner

*Primary Examiner* — George B Bennett
(74) *Attorney, Agent, or Firm* — Rankin, Hill & Clark LLP

(57) ABSTRACT

There is provided a roughness tester that improves measurement efficiency and roughness measurement accuracy.

A roughness tester includes a stylus unit including a stylus that is provided in such a manner as to protrude from and retract into a through hole of a skid and performs scanning movement along a surface of a workpiece, and a stylus displacement detecting unit that detects displacement of the stylus, and a drive unit that moves the stylus unit forward and backward in a drive-axis direction. The roughness tester further includes a height detector that is provided in such a manner as to face a front end face of the main-body housing part, interposing the skid between the height detector and the front end face and that detects a height of an object in a direction parallel with a measurement axis. When the height detector detects the object at the same height of the height of the main-body support foot in the measurement axis direction, the drive unit automatically starts driving in order for the stylus unit to perform scanning measurement of the surface of the workpiece.

6 Claims, 11 Drawing Sheets

ROUGHNESS TESTER

INCORPORATION BY REFERENCE

This application is based upon and claims the benefit of priority from Japanese patent application No. 2019-163447, filed on Sep. 6, 2019, (Priority DAS code 4B78) the disclosure of which are incorporated herein in its entirety by reference.

BACKGROUND OF THE INVENTION

1. Field of the Invention

The present invention relates to a roughness tester.

2. Description of Related Art

Roughness testers are known as a measuring machine for measuring the roughness of a workpiece surface (for example, JP 3640201 B, JP 3373465 B, JP 3443054 B, and JP 3531924 B).

A roughness tester includes a stylus unit including a stylus provided in such a manner as to be displaceable in a direction vertical to a workpiece surface and a drive unit that moves the stylus unit forward and backward along the workpiece surface.

There are compact roughness testers so as to be portable. For example, a compact roughness tester is carried to a site where there is a workpiece, and the compact roughness tester is placed or pressed on the surface to be measured of the workpiece to perform roughness measurement of the workpiece surface at the site.

SUMMARY OF THE INVENTION

With the above compact roughness tester, measurement is started by an operator pressing a measurement start button after setting the compact roughness tester at a measurement position. However, holding the compact roughness tester with one hand and pressing the measurement start button with the other hand is rather troublesome. This is one of the reasons for preventing improvement of measurement efficiency. In addition, in order to accurately measure the surface roughness, the stylus needs to be properly vertically in contact with a workpiece surface. The operator is required to determine whether the stylus is vertically in contact with the workpiece surface. However, the stylus itself is very small and is difficult to visually recognize, and this easily causes measurement errors depending on the skill of the operator.

A purpose of the present invention is to provide a roughness tester that improves measurement efficiency and roughness measurement accuracy.

A roughness tester according to an embodiment of the present invention includes a drive unit including a movable piece member provided in such a manner as to move forward and backward in a predetermined drive-axis direction with driving force of a motor, a stylus unit including a stylus that is provided in such a manner as to protrude from and retract into a through hole of a skid and performs scanning movement along a surface of a workpiece, and a stylus displacement detecting unit that detects displacement of the stylus, a coupling means for coupling, when a direction in which the stylus protrudes from the through hole of the skid is a first direction and when a predetermined axis orthogonal to the drive-axis direction is a measurement axis, the stylus unit to the movable piece member in a state in which the first direction is substantially parallel with the measurement axis, a biasing means for biasing the stylus unit in the first direction, a main-body housing part accommodating the drive unit and the stylus unit and allowing the stylus unit to protrude from a front end face to move forward and backward in parallel with the drive-axis direction; and a height detector that is provided in such a manner as to face the front end face of the main-body housing part, interposing the skid between the height detector and the front end face and detects a height of an object in a direction parallel with the measurement axis, in which the main-body housing part has a base face positioned in the first direction of the main-body housing part, the base face is provided with a main-body support foot to be brought into contact with the surface of the workpiece in measurement, and the drive unit automatically starts driving, when the height detector detects the object at the same height as the height of the main-body support foot in the measurement axis direction, in order for the stylus unit to perform scanning measurement of the surface of the workpiece.

In an embodiment of the present invention, it is preferable that a coupling rod extending from the main-body housing part in parallel with the drive-axis direction is provided, and that the height detector is attached to a tip end of the coupling rod.

In an embodiment of the present invention, it is preferable that the height detector includes a detector support foot to be brought into contact with the workpiece at the same height as the height of the main-body support foot in the measurement axis direction.

A roughness tester unit according to an embodiment of the present invention includes the roughness tester installed on a transportation table having a flat top face, in which the roughness tester unit includes a plurality of the roughness testers.

In an embodiment of the present invention, it is preferable that the plurality of the roughness testers is installed on the transportation table in such a manner that each base face faces upward, and that the roughness tester automatically starts measurement, when the workpiece is placed in such a manner as to straddle the height detector and the main-body support foot, in order for the stylus unit to perform scanning measurement of the surface of the workpiece.

A roughness tester according to an embodiment of the present invention includes a drive unit including a movable piece member provided in such a manner as to move forward and backward in a predetermined drive-axis direction with driving force of a motor, a stylus unit including a stylus that is provided in such a manner as to protrude from and retract into a through hole of a skid and performs scanning movement along a surface of a workpiece, and a stylus displacement detecting unit that detects displacement of the stylus, a coupling means for coupling, when a direction in which the stylus protrudes from the through hole of the skid is a first direction and when a predetermined axis orthogonal to the drive-axis direction is a measurement axis, the stylus unit to the movable piece member in a state in which the first direction is substantially parallel with the measurement axis, a biasing means for biasing the stylus unit in the first direction, a main-body housing part accommodating the drive unit and the stylus unit and allowing the stylus unit to protrude from a front end face to move forward and backward in parallel with the drive-axis direction, and a height detector that detects a height of an object in a direction parallel with the measurement axis, in which the drive unit automatically starts driving, when the height detector detects a posture of the stylus unit when the stylus is vertically brought into contact with the surface of the workpiece, in order for the stylus unit to perform scanning measurement of the surface of the workpiece.

DETAILED DESCRIPTION

Figure 1:
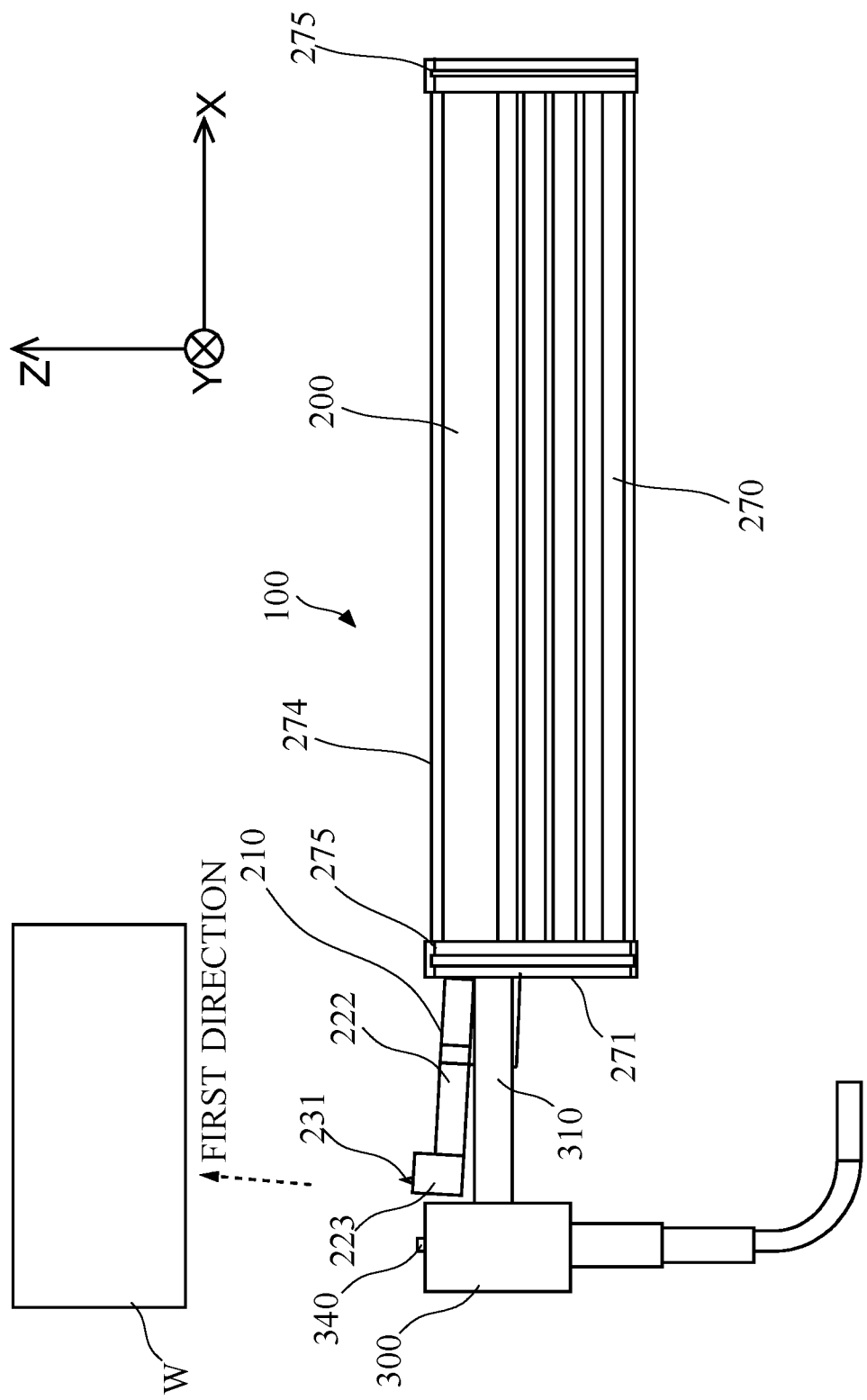
FIG. 1 is a side view of a roughness tester.

An embodiment of the present invention is illustrated and described with reference to the reference signs attached to the elements in the drawings.

First Exemplary Embodiment

A roughness tester according to a first exemplary embodiment of the present invention is described below.

Figure 2:
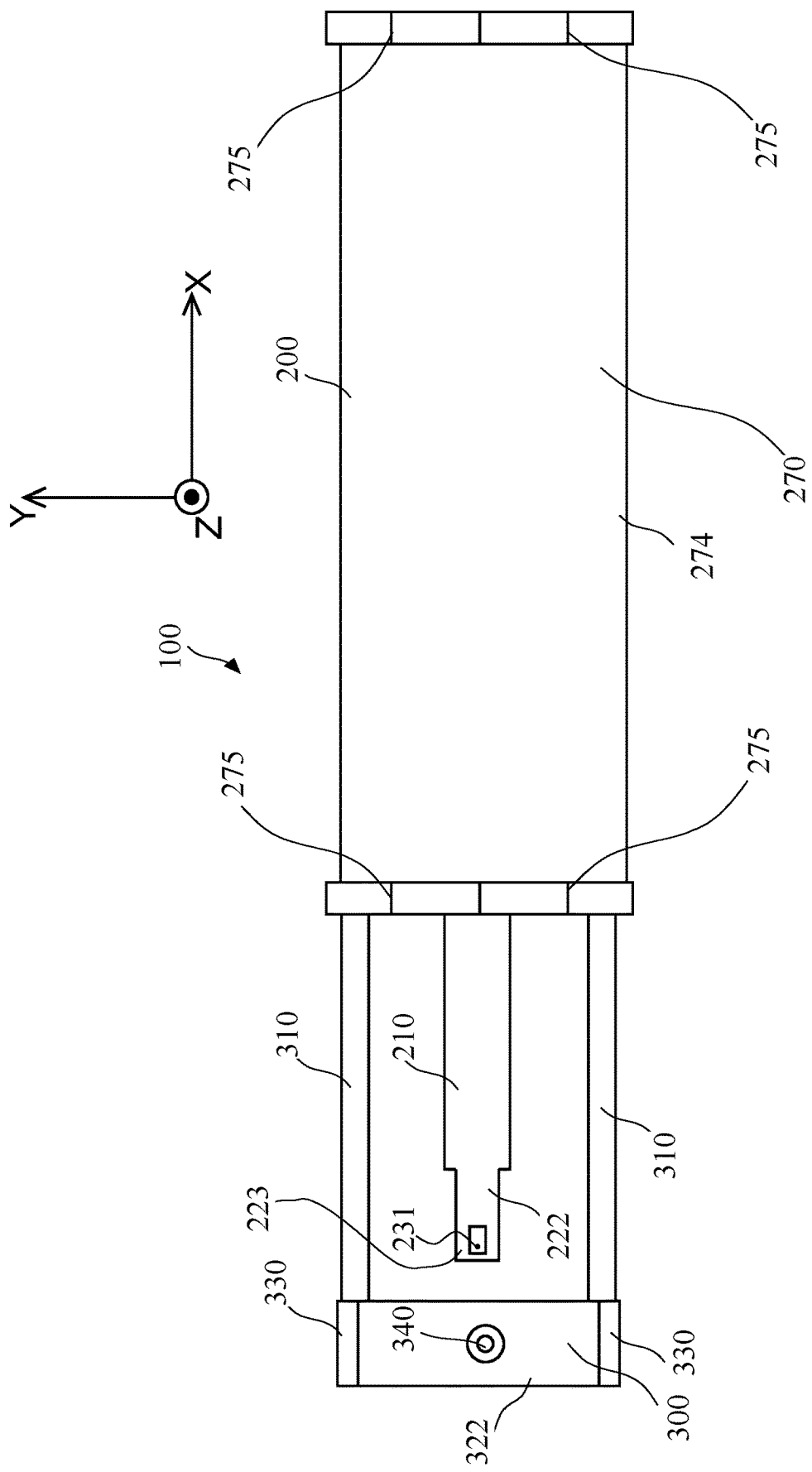
FIG. 2 is a view of the roughness tester when viewed from the positive side of a Z axis.
Figure 3:
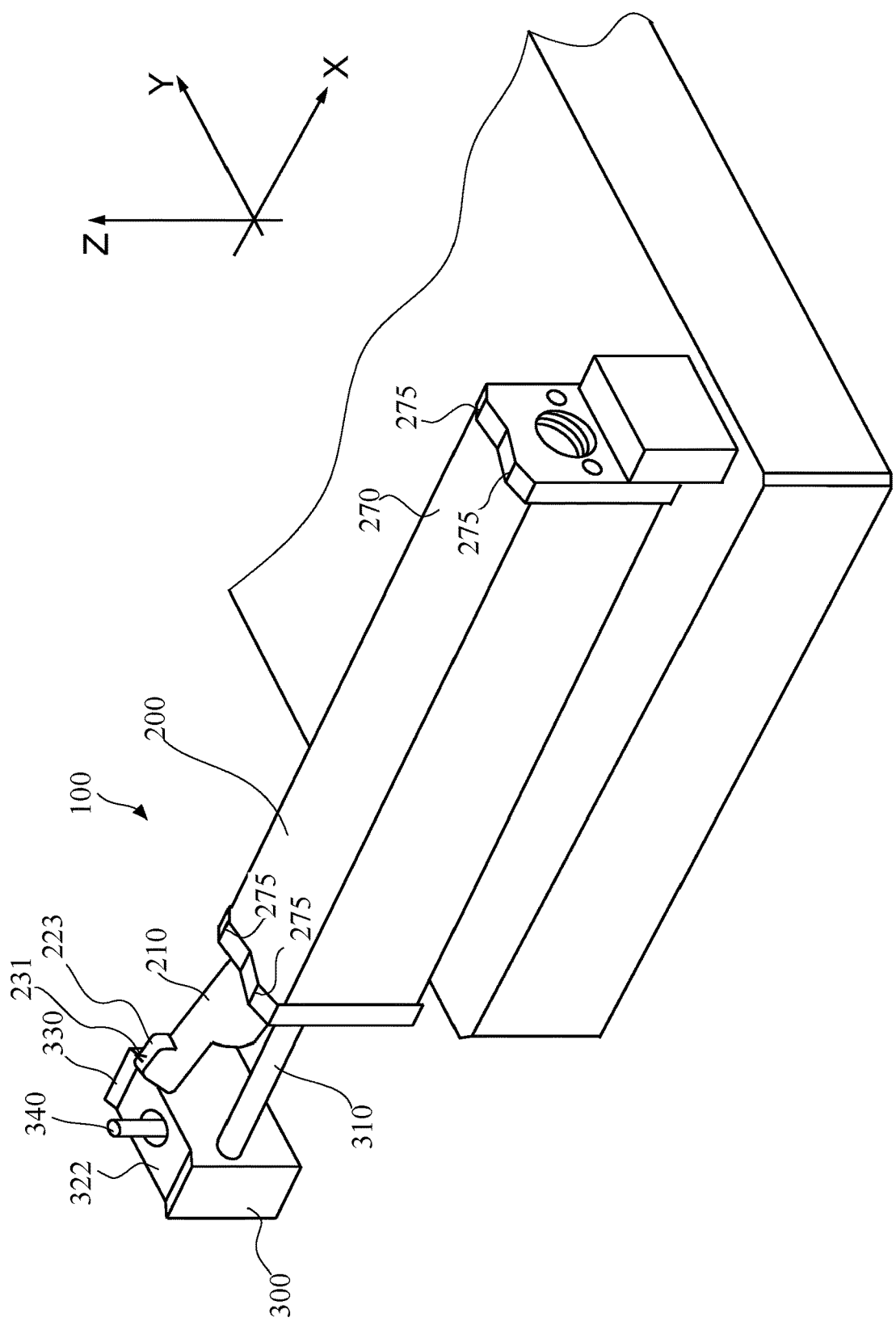
FIG. 3 is a perspective view of the roughness tester.
Figure 4:
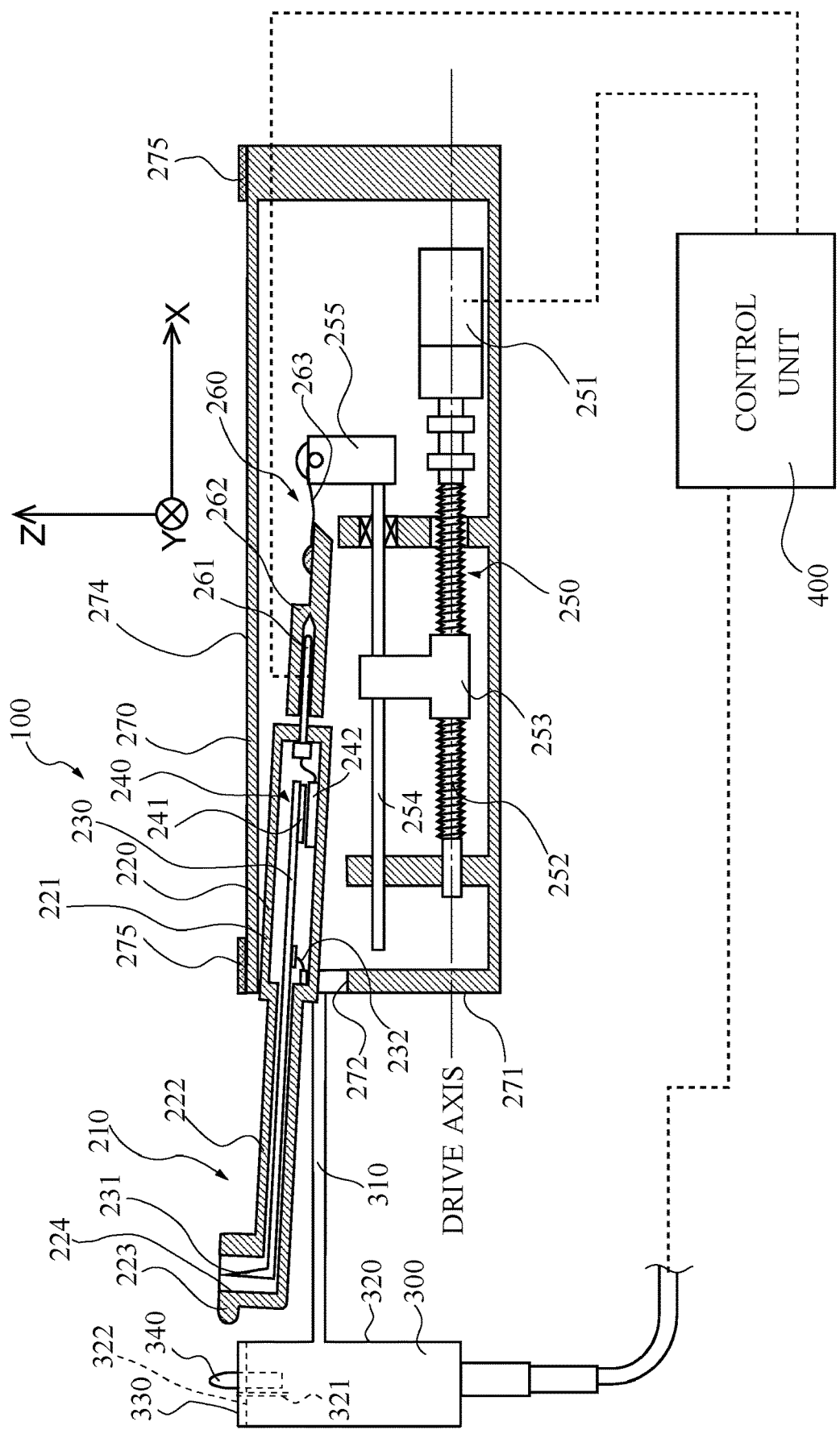
FIG. 4 is a cross sectional view of the roughness tester.

FIG. 1 is a side view of a roughness tester.
FIG. 2 is a view of the roughness tester when viewed from the positive side of a Z axis.
FIG. 3 is a perspective view of the roughness tester.
FIG. 4 is a cross sectional view of the roughness tester.

Figure 6:
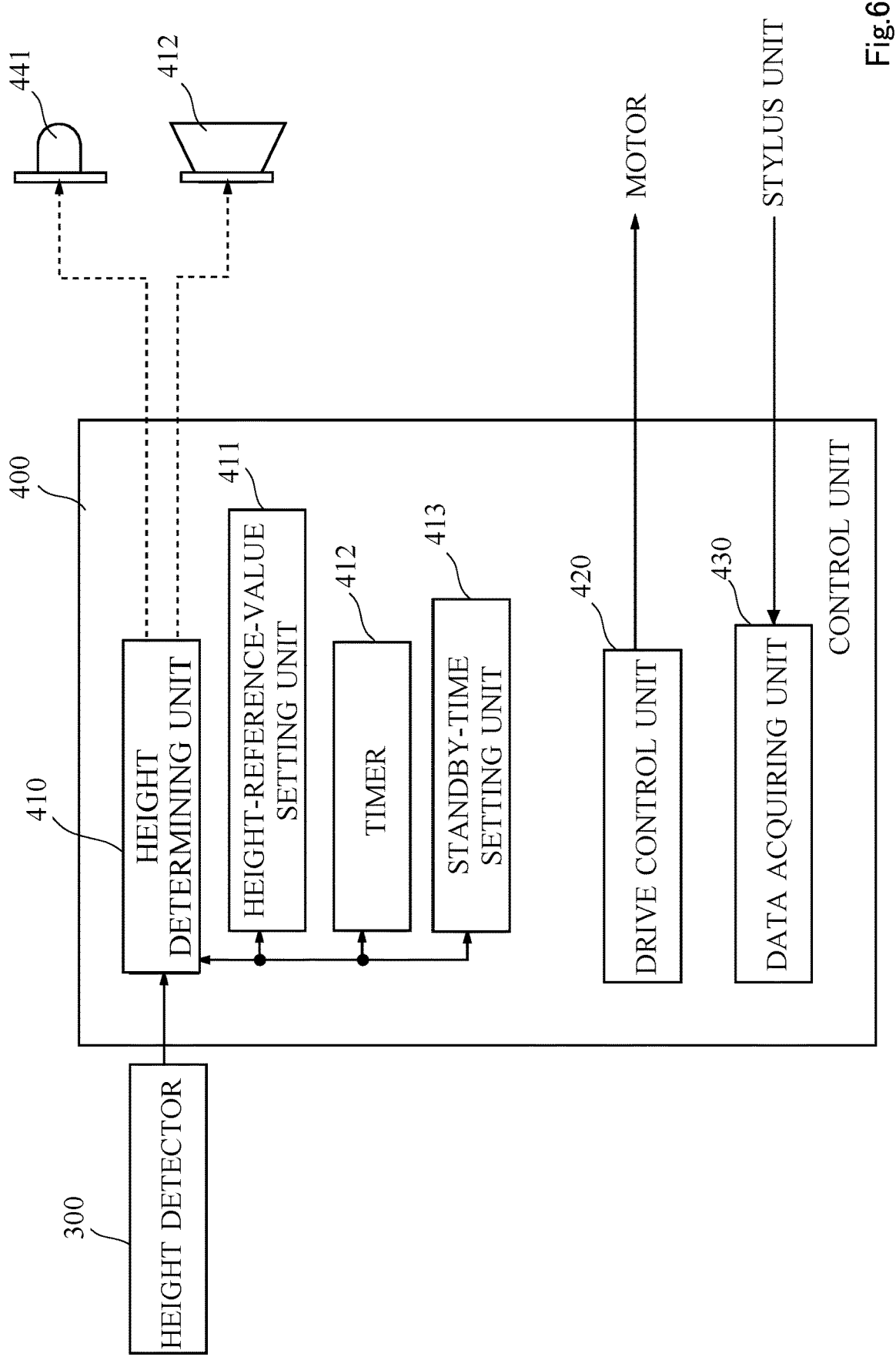
FIG. 6 is a functional block diagram showing a control unit.

A roughness tester 100 according to the present exemplary embodiment includes a measurement main body 200, a height detector 300, and a control unit 400. (The control unit 400 is shown in FIGS. 4 and 6.)

The configuration of the measurement main body 200 is basically common to the configuration of a known roughness tester. The configuration of the measurement main body 200 is briefly described below. The measurement main body 200 includes, for example, a stylus unit 210, a drive unit 250, and a main-body housing part 270 as shown in FIG. 4.

The stylus unit 210 includes a casing body 220 having a space thereinside, a stylus lever 230 provided in such a manner as to be swingable in the casing body 220, and a stylus displacement detecting unit 240. The casing body 220 includes a cylindrical trunk part 221 having a large diameter and a nose part 222 protruding from the tip end of the trunk part 221. The tip end of the nose part 222 is provided with a skid 223.

The skid 223 includes a through hole 224 thereinside, and the through hole 224 is continuous to the hollow inside the nose part 222.

The stylus lever 230 includes a stylus 231 facing upward at the tip end thereof.

Now, it is assumed, for the sake of explanation, that coordinates are set as shown in FIGS. 1 to 5, 9, and 10 and that the −X direction side in the X-axis direction of the coordinates is referred to as the front side of the roughness tester 100, and the +X direction side in the X-axis direction is referred to as the rear side of the roughness tester 100. However, when the roughness tester 100 is actually used, the vertical and horizontal directions (postures) are not limited, and the direction (posture) of the roughness tester 100 is selected according to an object to be measured.

The stylus lever 230 is inserted from the trunk part 221 to the nose part 222 and arranged in such a manner that the stylus 231 at the tip end is exposed from the opening of the skid 223. The stylus lever 230 is attached at the middle portion thereof to the internal space of the casing body 220 by a flat spring 232. The flat spring 232 serves as the swing fulcrum of the stylus lever 230 and elastically supports the stylus lever 230 in such a manner that the stylus 231 can balance while the stylus 231 is slightly protruding from the skid 223.

The stylus displacement detecting unit 240 is arranged inside the trunk part 221. The stylus displacement detecting unit 240 includes a ferrite plate 241 and an inductance detector 242.

The ferrite plate 241 is attached to the rear end of the stylus lever 230. The inductance detector 242 is attached to the position facing the ferrite plate 241 in the internal space of the trunk part 221.

The top face of the skid 223 is a workpiece contact surface to be brought into contact with a workpiece W in measurement. When the skid 223 moves along the measuring surface of the workpiece W, the waviness of the workpiece surface is absorbed by the skid 223, but the stylus 231 moves upward and downward due to the surface roughness of the measuring surface. When the stylus 231 moves upward and downward, the inductance detector 242 detects the up/down movement of the stylus 231. The inductance detector 242 outputs a detect signal, and the surface roughness of the measuring surface of the workpiece W excluding the waviness is thereby obtained. The stylus unit 210 outputs the measurement result of the surface roughness of the measuring surface of the workpiece W (the displacement of the stylus 231) to an external device (here, the control unit 400).

The drive unit 250 includes a motor 251, a feeding screw 252, a screw-receiving nut 253, a guide shaft 254, and a movable piece member 255. The feeding screw 252 is coupled to the motor 251 and rotationally driven by the power of the motor 251. The feeding screw 252 is screwed in the screw-receiving nut 253, and the screw-receiving nut 253 is fixed to the guide shaft 254. The screw-receiving nut 253 is screw-fed by the rotation of the feeding screw 252, and the guide shaft 254 is borne in such a manner as to slide integrally with the screw-receiving nut 253. The movable piece member 255 is fixed to the guide shaft 254 and slides integrally with the guide shaft 254.

Here, it is assumed that the moving direction of the movable piece member 255 is a drive-axis direction (X-axis direction). In the present exemplary embodiment, the axis line of the feeding screw 252 and the axis line of the guide shaft 254 are parallel with the drive-axis direction (X-axis direction). The X axis is set to be parallel with the drive-axis direction. The Z axis is set to be the direction vertical to the X axis.

The stylus unit 210 is coupled to the movable piece member 255 by a coupling unit 260. The coupling unit 260 includes a connector rod 261, a connector socket 262, and a flat spring 263.

The connector rod 261 is attached to the terminal end of the trunk part 221 of the stylus unit 210 and serves as a conductor line of the inductance detector 242 and a connecting pin. (The number of connector rods 261 is only required to be two or three in consideration of the number of necessary signal lines or fixing strength.) The connector rod 261 is inserted and held in the connector socket 262, and the connector socket 262 is coupled to the movable piece member 255 by the flat spring 263. The flat spring 263 serves as a supporting means for supporting the stylus unit 210 in a cantilever manner and as a biasing means for biasing the tip end (the skid 223) of the stylus unit 210 in the direction in which the stylus 231 protrudes.

When the feeding screw 252 of the drive unit 250 is rotationally driven by the power of the motor 251, the screw-receiving nut 253, the guide shaft 254, and the movable piece member 255 are screw-fed. At this time, the stylus unit 210 is fed integrally with the movable piece member 255 along the axis line parallel with the drive-axis direction.

Here, it is assumed that the direction in which the stylus 231 protrudes from the skid 223 is a first direction. The coupling unit 260 is, as a reference state, in the state in which the first direction is parallel with the Z axis, that is, in which the first direction is vertical to the drive-axis direction (X-axis direction), and the flat spring 263 applies biasing force in the direction in which the skid 223 is biased in the first direction from the reference state. Then, the displacement of the stylus 231 in the direction parallel with the Z-axis direction is equivalent to the surface roughness of the workpiece. Accordingly, the Z-axis direction is equivalent to the measurement axis direction.

The main-body housing part 270 has a rectangular external shape, is hollow, and accommodates the stylus unit 210 and the drive unit 250. The main-body housing part 270 has a front end face 271 provided with a hole 272 from which the stylus unit 210 protrudes. In the main-body housing part 270, a face on the first direction side is referred to as a main-body base face 274. (With reference to the axes in the present exemplary embodiment, the main-body base face 274 is also positioned on the positive side of the Z axis in the main-body housing part 270.) The main-body base face 274 is parallel with the drive-axis direction and vertical to the Z axis. (However, the important thing is the height of a main-body support foot 275 to be described later, and the direction, flatness, or curve of the main-body base face 274 itself is not necessarily important.)

Figure 5:
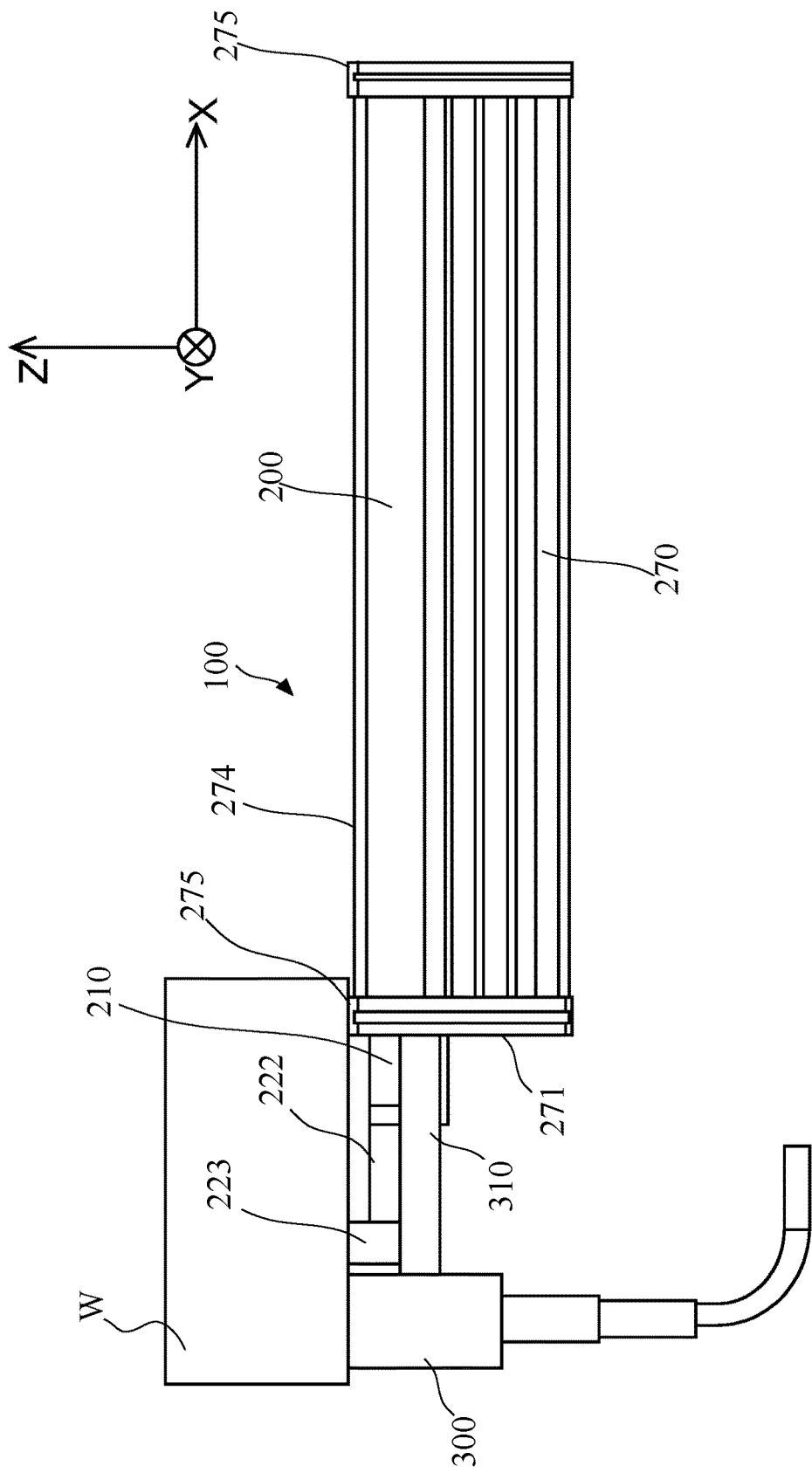
FIG. 5 is a diagram showing that a workpiece is in contact with the roughness tester.

The main-body base face 274 is provided with support feet 275 on the front and rear sides. Each support foot is referred to as the main-body support foot 275. Each main-body support foot 275 is designed to have the same height as the height of the tip end of the stylus 231 when the stylus 231 is parallel with the Z axis. That is, based on the assumption that the surface roughness of a flat workpiece surface is to be measured, the height of each main-body support foot 275 is designed in such a manner that the stylus 231 is vertically brought into contact with the workpiece surface when workpiece surface is in contact with the main-body support foot 275. For example, FIG. 5 shows that the workpiece W is in contact with the roughness tester 100.

Next, the height detector 300 is described below.

The height detector 300 is provided on the front end face 271 side of the main-body housing part 270 in such a manner as to face the front end face 271, interposing the stylus unit 210 (the skid 223) therebetween. Specifically, a coupling rod 310 having a predetermined length is attached to the front end face 271 of the main-body housing part 270, and the height detector 300 is fixed at the tip end of the coupling rod 310. The height detector 300 includes a detector casing 320, a detector support foot 330, and a height detecting pin 340.

The detector casing 320 is an exterior casing incorporating, thereinside, a displacement detecting sensor 321 (for example, an encoder) that detects the displacement of the height detecting pin 340. In the detector casing 320, a face positioned in the first direction is referred to as a detector base face 322. (With reference to the axes in the present exemplary embodiment, the detector base face 322 is also positioned on the positive side of the Z axis in the detector casing 320.) The detector base face 322 is parallel with the drive-axis direction and vertical to the Z axis. (However, the important thing is the height of the detector support foot 330 to be described later, and the direction, flatness, or curve of the detector base face 322 itself is not necessarily important.)

The detector base face 322 is provided with the detector support foot 330.

The detector support foot 330 is designed to have the same height as the height of the tip end of the stylus 231 when the stylus 231 is parallel with the Z axis. That is, based on the assumption that the surface roughness of a flat workpiece surface is to be measured, the height of the detector support foot 330 is designed in such a manner that the stylus 231 is vertically brought into contact with the workpiece surface when the workpiece surface is contact with the detector support foot 330. More specifically, the heights of the main-body support foot 275 and the detector support foot 330 are designed in such a manner that the stylus 231 is vertically brought into contact with the workpiece surface when the workpiece surface is contact with the main-body support foot 275 and the detector support foot 330. In other words, the tip end of the main-body support foot 275 and the tip end of the detector support foot 330 are on the same virtual plane, and this virtual plane is parallel with the drive-axis direction (X-axis direction) and vertical to the Z axis. Then, when the posture of the stylus unit 210 supported by the coupling unit 260 in a cantilever manner is swung using the coupling unit 260 as the fulcrum to position the tip end of the stylus 231 on the virtual plane, the stylus 231 is vertical to the virtual plane.

The height detecting pin 340 moves forward and backward from the detector base face 322 in parallel with the Z-axis direction. The displacement (or height position) of the height detecting pin 340 is detected by the displacement detecting sensor 321 provided in the detector casing 320. The height detecting pin 340 is biased in the direction protruding from the detector base face 322, and the height detecting pin 340 protrudes higher than the main-body support foot 275 and the detector support foot 330 when no external force is applied. (The height detecting pin 340 is, for example, a spindle (probe), such as an electric micrometer, a dial gauge, or a linear gauge, and may be held by the detector casing.)

During the roughness measurement of a workpiece surface, an operator slowly brings the roughness tester 100 close to the workpiece W in such a manner that the workpiece surface is brought into contact with the main-body support foot 275 and the detector support foot 330, and gently bring them into contact. At this time, the height detecting pin 340 is pushed by the workpiece W and moves backward. The displacement amount (or the height position) of the height detecting pin 340 at this time is detected by the displacement detecting sensor 321.

Next, the configuration and operation of the control unit 400 are described with reference to FIGS. 6, 7, and 8.

FIG. 6 is a functional block diagram showing the control unit 400.

Figure 7:
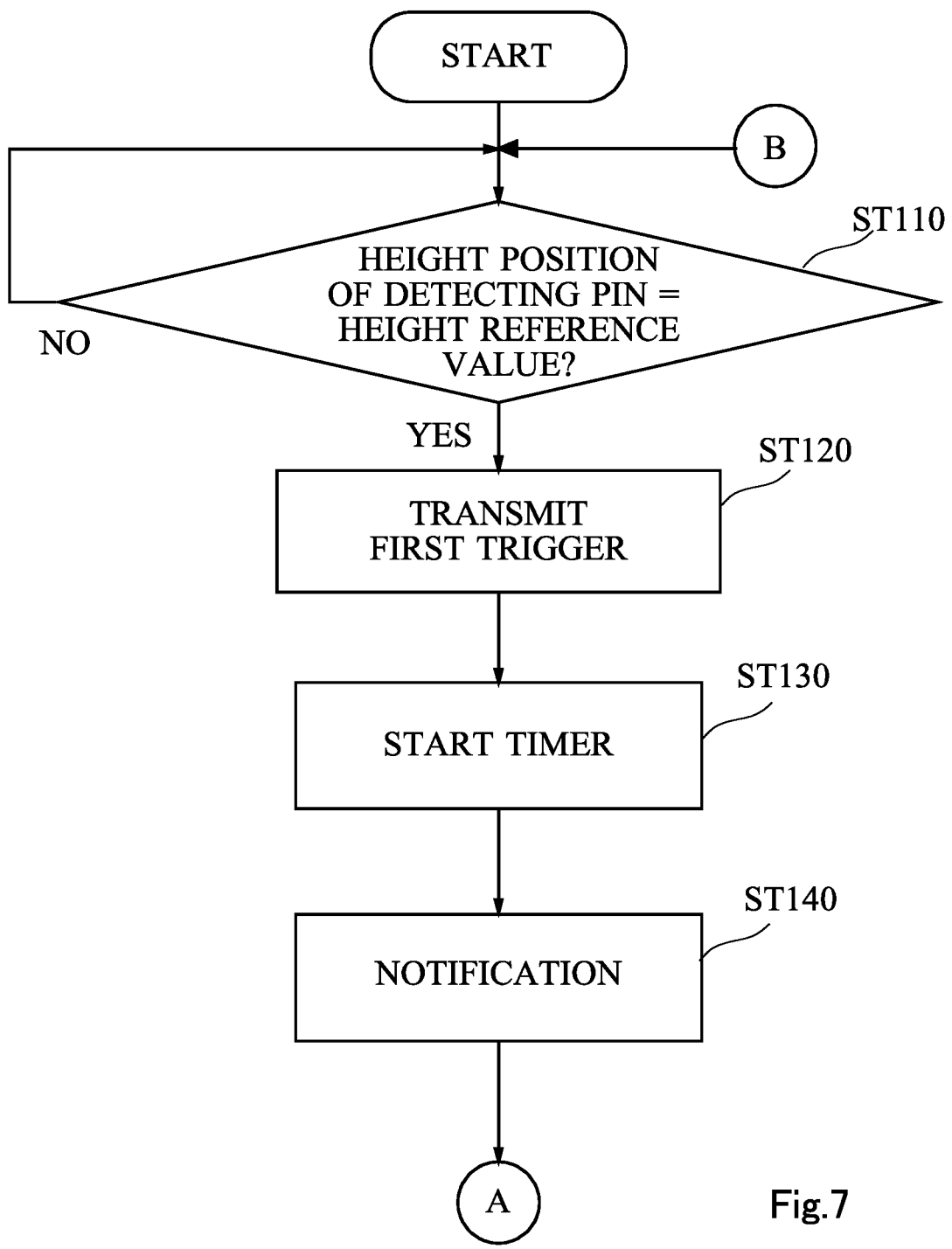
FIG. 7 is a flowchart for explaining operation of the control unit.
Figure 8:
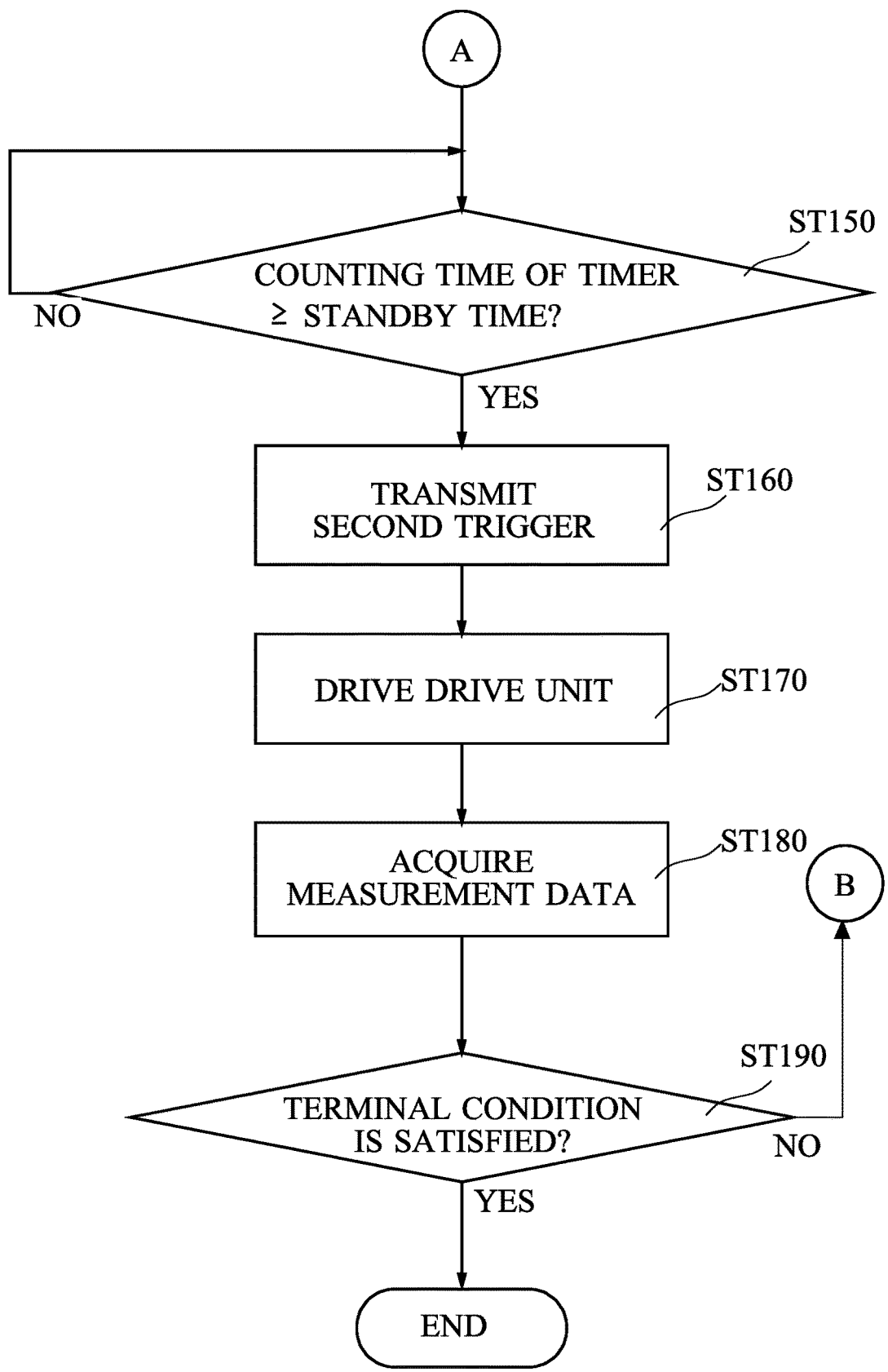
FIG. 8 is a flowchart for explaining the operation of the control unit.

FIGS. 7 and 8 are flowcharts for explaining the operation of the control unit 400.

The control unit 400 includes a height determining unit 410, a drive control unit 420, and a data acquiring unit 430. The displacement (or the height position) of the height detecting pin 340 detected by the height detector 300 is input to the height determining unit 410. The height determining unit 410 includes a height-reference-value setting unit 411, a timer 412, and a standby-time setting unit 413.

In the height-reference-value setting unit 411, a height reference value is set. The height reference value is used to detect that the tip end of the height detecting pin 340 reaches the same height as the heights of the main-body support foot 275 and the detector support foot 330. During the roughness measurement of the workpiece surface, when the workpiece surface is brought into contact with the main-body support foot 275 and the detector support foot 330, the height detecting pin 340 is pushed by the workpiece W and moves backward. The height determining unit 410 compares the height of the height detecting pin 340 detected by the height detector 300 with the height reference value (ST110). If the height of the height detecting pin 340 is equal to the height reference value (ST110: YES), the height determining unit 410 transmits a first trigger signal (ST120).

Note that, the height reference value may be set as a range with a margin. In this case, the height determining unit 410 transmits the first trigger signal when the height of the height detecting pin 340 is within the range of the height reference value.

When the height determining unit 410 transmits the first trigger signal, the timer 412 starts counting (ST130). At the same time, a lamp 441 or a speaker 442 notifies, in response to the first trigger signal, the operator that the height detecting pin 340 reaches the same height as the heights of the main-body support foot 275 and the detector support foot 330 with light or sound (ST140). The operator recognizes, by the notification with light or sound, that the roughness tester 100 and workpiece W are appropriately set. The lamp 441 or the speaker 442 may be, for example, a tablet or a smartphone carried by the user. The notifying means may be oscillation (an eccentric motor that generates oscillation) besides light and sound. The lamp 441 or the speaker 442 may use any wireless communication system to communicate with the control unit 400.

In the standby-time setting unit 413, a standby time, such as five or ten seconds, is set. This is a waiting time from the time when the height of the height detecting pin 340 is equal to the height reference value until the time when the measurement movement is actually started, and is only required to be set to an arbitrary value for the operator to easily operate.

The height determining unit 410 waits until the standby time at which the counting time of the timer 412 is set (ST150), and transmits a second trigger signal when the counting time reaches the standby time (ST160). In response to the second trigger signal, the drive control unit 420 starts controlling the operation of the drive unit 250 (ST170). (For example, the drive control unit 420 applies drive current to the drive unit 250.) Then, the feeding screw 252 is rotationally driven by the motor 251, and the stylus unit 210 performs scanning measurement of the workpiece surface. The displacement data of the stylus 231 is sent from the inductance detector 242 to the data acquiring unit 430 and is stored (ST180)

According to the present exemplary embodiment, the following effects are obtained.

(1) In the present exemplary embodiment, the height detector 300 detects the height (position) of a workpiece surface, and measurement movement is automatically started when the workpiece surface reaches an appropriate position. Accordingly, the operator is not required to perform operation, such as separately pushing a start button. For example, the operator is only required to hold either the workpiece W or the roughness tester 100 with only one hand and set it at the measurement position. Then, the measurement movement is automatically started, and measurement data is collected. The operator can variously perform necessary work, such as operating a personal computer or tablet, or preparation for the next workpiece, with the other unoccupied hand. This allows the operator to easily efficiently perform measurement work.

(2) In the present exemplary embodiment, the roughness tester 100 includes the height detector 300, and the measurement is automatically stated when the height position of the workpiece surface reaches an appropriate position. That is, starting the measurement means that the stylus 231 is vertically in contact with the workpiece surface, and that the roughness measurement is properly performed.

(3) The roughness measurement can be performed on an smaller object than the main-body housing part 270 or the edge of the workpiece W, and the support foot 275 on the rear side of the main-body housing part 270 cannot be brought into contact with the workpiece W (for example, see FIG. 5). In this case, conventionally, the operator had no alternative but to bring the support foot 275 on the front side of the main-body housing part 270 into contact with the workpiece surface and visually confirm whether the stylus unit 210 was parallel with the workpiece surface. In this regard, the height detector 300 and the main-body housing part 270 are provided, interposing the skid 223 therebetween in the present exemplary embodiment, and the support feet 330 and 275 are provided respectively. Accordingly, when the support foot 330 of the height detector 300 and the support foot 275 on the front side of the main-body housing part 270 are brought into contact with the workpiece W, the stylus 231 is automatically vertically in contact with workpiece surface, and the roughness measurement can be stably accurately performed.

Usage Example 1

Figure 9:
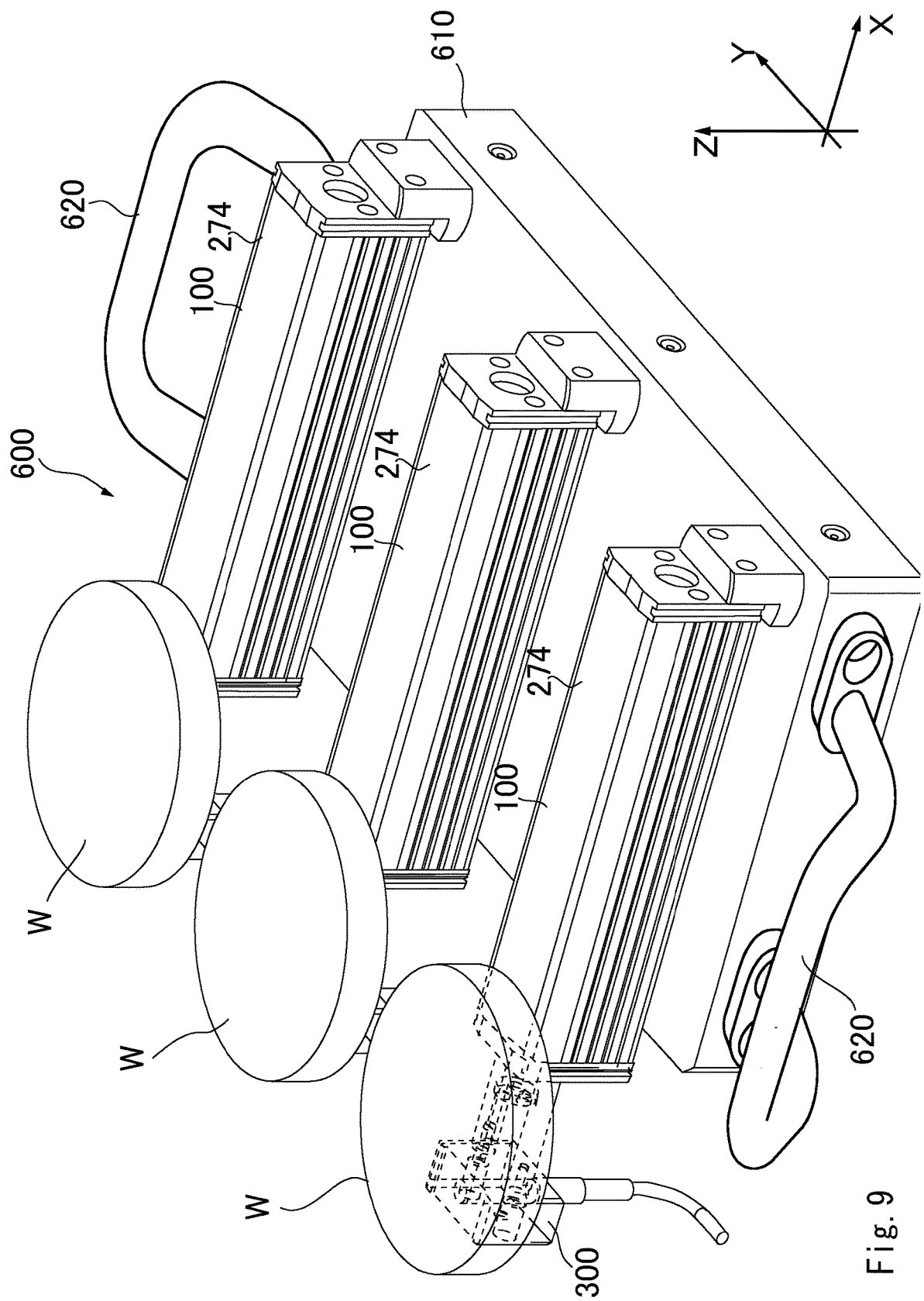
FIG. 9 is a diagram showing an example of a suitable usage example of the roughness tester.
Figure 10:
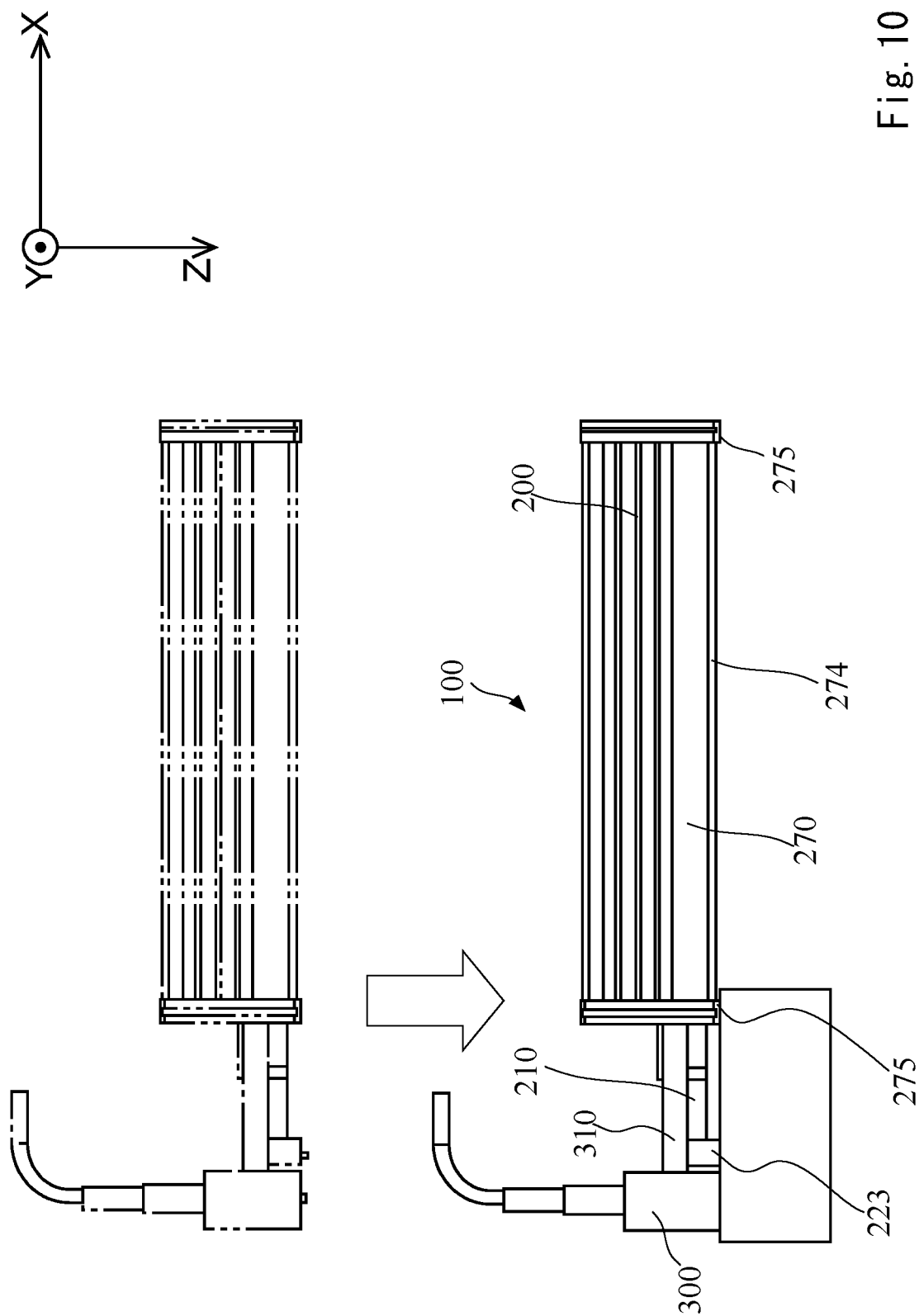
FIG. 10 is a diagram showing that a top face of a workpiece W is measured by the roughness tester.

FIG. 9 is a diagram showing a suitable usage example of the roughness tester 100.

In FIG. 9, a transportation table 610 having a flat top face is prepared.

The transportation table 610 includes grips 620 as gripping means on both ends thereof. On the top face of the transportation table 610, a plurality of (here, three) roughness testers 100 is installed. The roughness testers 100 are installed in a manner such that the main-body base faces 274 face upward. In this manner, a plurality of roughness testers 100 is unitized. The unitized roughness tester 100 is referred to as a roughness tester unit 600. To perform roughness measurement, the operator successively places workpieces W on which the roughness measurement is performed in such a manner as to straddle the height detector 300 and the front main-body support foot 275. The operator is only required to successively place the workpieces W and is not required to perform operation, such as pushing a start button.

In the above description, it has been described that the workpiece W is brought close to the roughness tester 100 from above, and the roughness tester 100 measures the face on the lower side (lower face) of the workpiece W. Naturally, as exemplified in FIG. 10, by bringing the roughness tester 100 close to the measuring surface of the workpiece W from above the workpiece W, the top face of the workpiece W may be measured. When the roughness tester unit in FIG. 9 is used, the roughness tester unit 600 is placed on the top face of the workpiece W. In this case, three pieces of roughness measurement data are obtained in one measurement, and the measurement efficiency is improved.

First Modification

Figure 11:
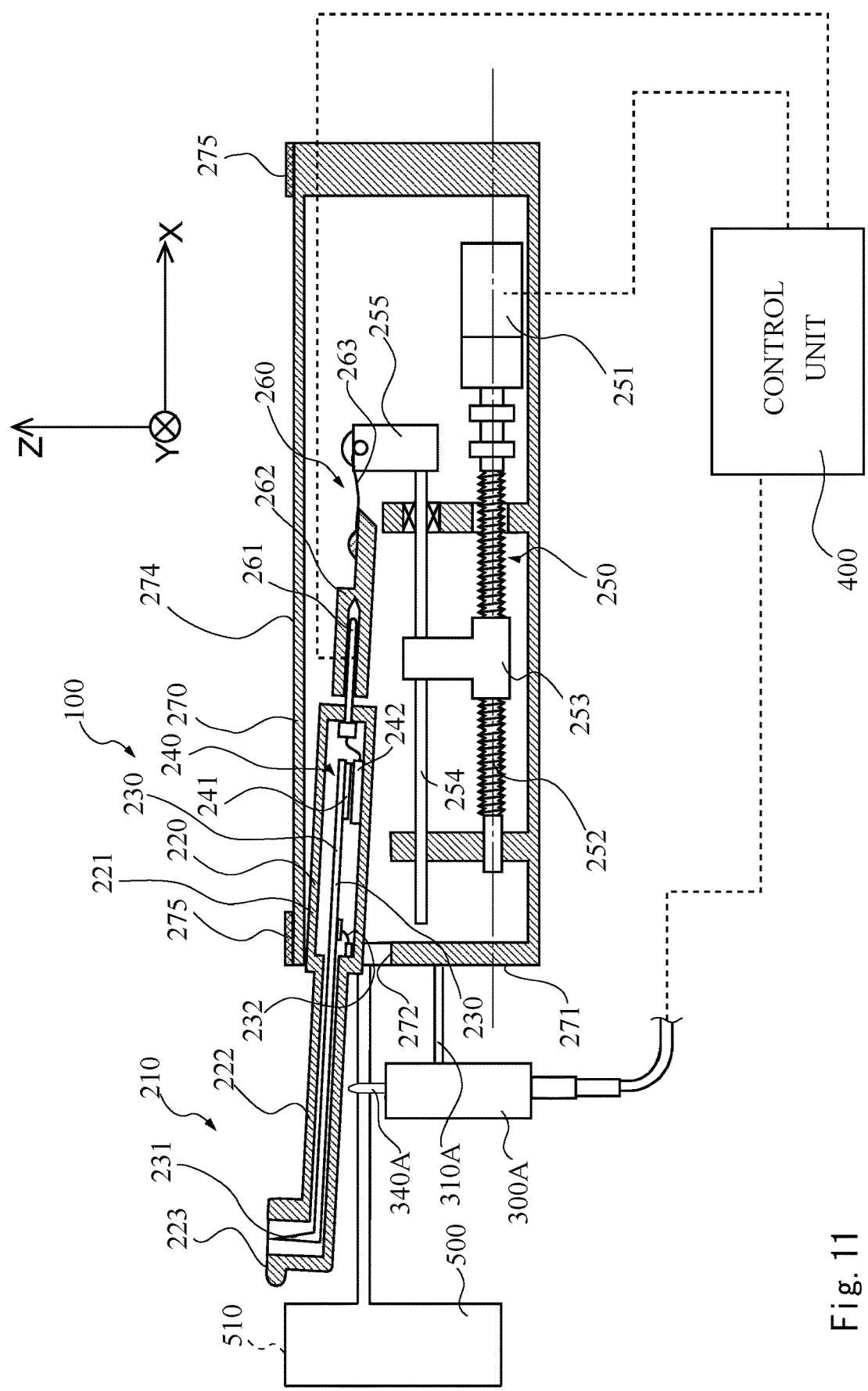
FIG. 11 is a diagram exemplifying a first modification.

The height detector detects the height of the workpiece surface in the first exemplary embodiment, but a height detector 300A may be provided, as exemplified in FIG. 11, to detect the height position (posture) of the stylus unit 210. In FIG. 11, the height detector 300A is provided to detect that the posture of the stylus unit 210 is parallel with the drive axis. Here, the height detector 300A is held by a coupling rod 310A extending from the front end face 271 of the main-body housing part 270. However, the height detector 300A may be provided inside the main-body housing part 270. A supporting base part 500 may be provided in such a manner as to face the front end face 271 of the main-body housing part 270, interposing the stylus unit 210 (the skid 223) therebetween to provide a support foot 510, but the supporting base part 500 may be omitted. In the height-reference-value setting unit 411 of the control unit 400, a detect value of the height detector 300A when the stylus 231 is vertical to the drive-axis direction (a reference state) is set as a height reference value. The subsequent operation is substantially the same as the operation described in the first exemplary embodiment, and the roughness tester automatically starts measurement movement when the stylus 231 is vertically brought into contact with the workpiece surface.

Note that, the present invention is not limited to the above exemplary embodiment and can be appropriately modified without departing from the spirit.

The height detector has been exemplified as a contact height detector including a height detecting pin, but may be a contactless detector, such as a detector using a lase range method.

REFERENCE SIGNS LIST

100 Roughness tester
200 Measurement main body
210 Stylus unit
220 Casing body
221 Trunk part
222 Nose part
223 Skid
224 Through hole
230 Stylus lever
231 Stylus
232 Flat spring
240 Stylus displacement detecting unit
241 Ferrite plate
242 Inductance detector
250 Drive unit
251 Motor
252 Feeding screw
253 Screw-receiving nut
254 Guide shaft
255 Movable piece member
260 Coupling unit
261 Connector rod
262 Connector socket
263 Flat spring
270 Main-body housing part
271 Front end face
272 Hole
274 Main body base face
275 Main body support foot
300, 300A Height detector
310 Coupling rod
320 Detector casing
321 Displacement detecting sensor
322 Detector base face
330 Detector support foot
340 Height detecting pin
400 Control unit
400 Drive control unit
400 Control unit
410 Height determining unit
411 Height-reference-value setting unit
412 Timer
413 Standby-time setting unit
420 Drive control unit
430 Data acquiring unit
441 Lamp
442 Speaker
500 Supporting base part
510 Support foot
600 Roughness tester unit

The invention claimed is:
1. A roughness tester comprising:
a drive unit including a movable piece member provided in such a manner as to move forward and backward in a predetermined drive-axis direction with driving force of a motor;
a stylus unit including a stylus provided in such a manner as to protrude from and retract into a through hole of a skid and configured to perform scanning movement along a surface of a workpiece, and a stylus displacement detecting unit configured to detect displacement of the stylus;
a coupling means for coupling, when a direction in which the stylus protrudes from the through hole of the skid is a first direction and when a predetermined axis orthogonal to the drive-axis direction is a measurement axis, the stylus unit to the movable piece member in a state in which the first direction is substantially parallel with the measurement axis;
a biasing means for biasing the stylus unit in the first direction;
a main-body housing part accommodating the drive unit and the stylus unit and allowing the stylus unit to protrude from a front end face to move forward and backward in parallel with the drive-axis direction; and
a height detector provided in such a manner as to face the front end face of the main-body housing part, interposing the skid between the height detector and the front end face and configured to detect a height of an object in a direction parallel with the measurement axis, wherein
the main-body housing part has a base face positioned in the first direction of the main-body housing part,
the base face is provided with a main-body support foot to be brought into contact with the surface of the workpiece in measurement, and
the drive unit is configured to automatically start driving, when the height detector detects the object at the same height as the height of the main-body support foot in the measurement axis direction, in order for the stylus unit to perform scanning measurement of the surface of the workpiece.

2. The roughness tester according to claim 1, further comprising a coupling rod extending from the main-body housing part in parallel with the drive-axis direction, wherein the height detector is attached to a tip end of the coupling rod.

3. The roughness tester according to claim 1, wherein the height detector includes a detector support foot to be brought into contact with the workpiece at the same height as the height of the main-body support foot in the measurement axis direction.

4. A roughness tester unit comprising the roughness tester according to claim 3 installed on a transportation table having a flat top face, wherein the roughness tester unit includes a plurality of the roughness testers.

5. The roughness tester unit according to claim 4, wherein
the plurality of the roughness testers is installed on the transportation table in such a manner that each base face faces upward, and
the roughness tester is configured to automatically start measurement, when the workpiece is placed in such a manner as to straddle the height detector and the main-body support foot, in order for the stylus unit to perform scanning measurement of the surface of the workpiece.

6. A roughness tester comprising:
a drive unit including a movable piece member provided in such a manner as to move forward and backward in a predetermined drive-axis direction with driving force of a motor;

a stylus unit including a stylus provided in such a manner as to protrude from and retract into a through hole of a skid and configured to perform scanning movement along a surface of a workpiece, and a stylus displacement detecting unit configured to detect displacement of the stylus;

a coupling means for coupling, when a direction in which the stylus protrudes from the through hole of the skid is a first direction and when a predetermined axis orthogonal to the drive-axis direction is a measurement axis, the stylus unit to the movable piece member in a state in which the first direction is substantially parallel with the measurement axis;

a biasing means for biasing the stylus unit in the first direction;

a main-body housing part accommodating the drive unit and the stylus unit and allowing the stylus unit to protrude from a front end face to move forward and backward in parallel with the drive-axis direction; and a height detector configured to detect a height of an object in a direction parallel with the measurement axis, wherein the drive unit is configured to automatically start driving, when the height detector detects a posture of the stylus unit when the stylus is vertically brought into contact with the surface of the workpiece, in order for the stylus unit to perform scanning measurement of the surface of the workpiece.

* * * * *